(12) United States Patent
Roberts

(10) Patent No.: US 6,655,160 B2
(45) Date of Patent: Dec. 2, 2003

(54) REFRIGERANT COMPOSITIONS

(75) Inventor: Neil Andre Roberts, Bristol (GB)

(73) Assignee: Rhodia Limited, Hertfordshire (GB)

( * ) Notice: Subject to any disclaimer, the term of this patent is extended or adjusted under 35 U.S.C. 154(b) by 0 days.

(21) Appl. No.: 10/148,561

(22) PCT Filed: Nov. 30, 2000

(86) PCT No.: PCT/GB00/04580

§ 371 (c)(1),
(2), (4) Date: Oct. 30, 2002

(87) PCT Pub. No.: WO01/40400

PCT Pub. Date: Jun. 7, 2001

(65) Prior Publication Data

US 2003/0102456 A1 Jun. 5, 2003

(30) Foreign Application Priority Data

Dec. 3, 1999 (GB) .............................................. 9928683

(51) Int. Cl.[7] .............................................. F25D 25/00
(52) U.S. Cl. .............................. 62/114; 62/77; 62/115; 252/67
(58) Field of Search .............................. 62/114, 115, 77, 62/292; 252/67

(56) References Cited

U.S. PATENT DOCUMENTS 5,688,432 A 11/1997 Pearson .......................... 252/67

5,954,995 A * 9/1999 Goble .......................... 252/67

FOREIGN PATENT DOCUMENTS

GB 2 327 427 1/1999

OTHER PUBLICATIONS

Database WPI, Section Ch., Week 200035, Derwent Publications Ltd., London, GB; Class E19, AN 2000–409157, XP002160881 Aug. 1999.

RU 2 135 541 (Applied Chem Res Centre) Aug. 27, 1999, Abstract.

* cited by examiner

Primary Examiner—Yogendra N. Gupta
Assistant Examiner—Eisa Elhilo
(74) Attorney, Agent, or Firm—Burns, Doane, Swecker & Mathis, L.L.P.

(57) ABSTRACT

Refrigerant compositions are disclosed which comprise: (a) pentafluoroethane, octafluoropropane, trifluoromethoxydifluoromethane or hexafluoro-cyclopropane, or a mixture of two or more thereof, in an amount of at least 35% based on the weight of the composition, (b) 1,1,1,2- or 1,1,2,2-tetrafluoroethane, trifluoromethoxypentafluoroethane, 1,1,2,3,3-heptafluoropropane or a mixture of two or more thereof, in an amount of at least 30% by weight based on the weight of the composition and (c) n-butane or isobutane, in an amount from 1% to less than 2.3% by weight based on the weight of the composition.

24 Claims, 2 Drawing Sheets

REFRIGERANT COMPOSITIONS

Figure 1:
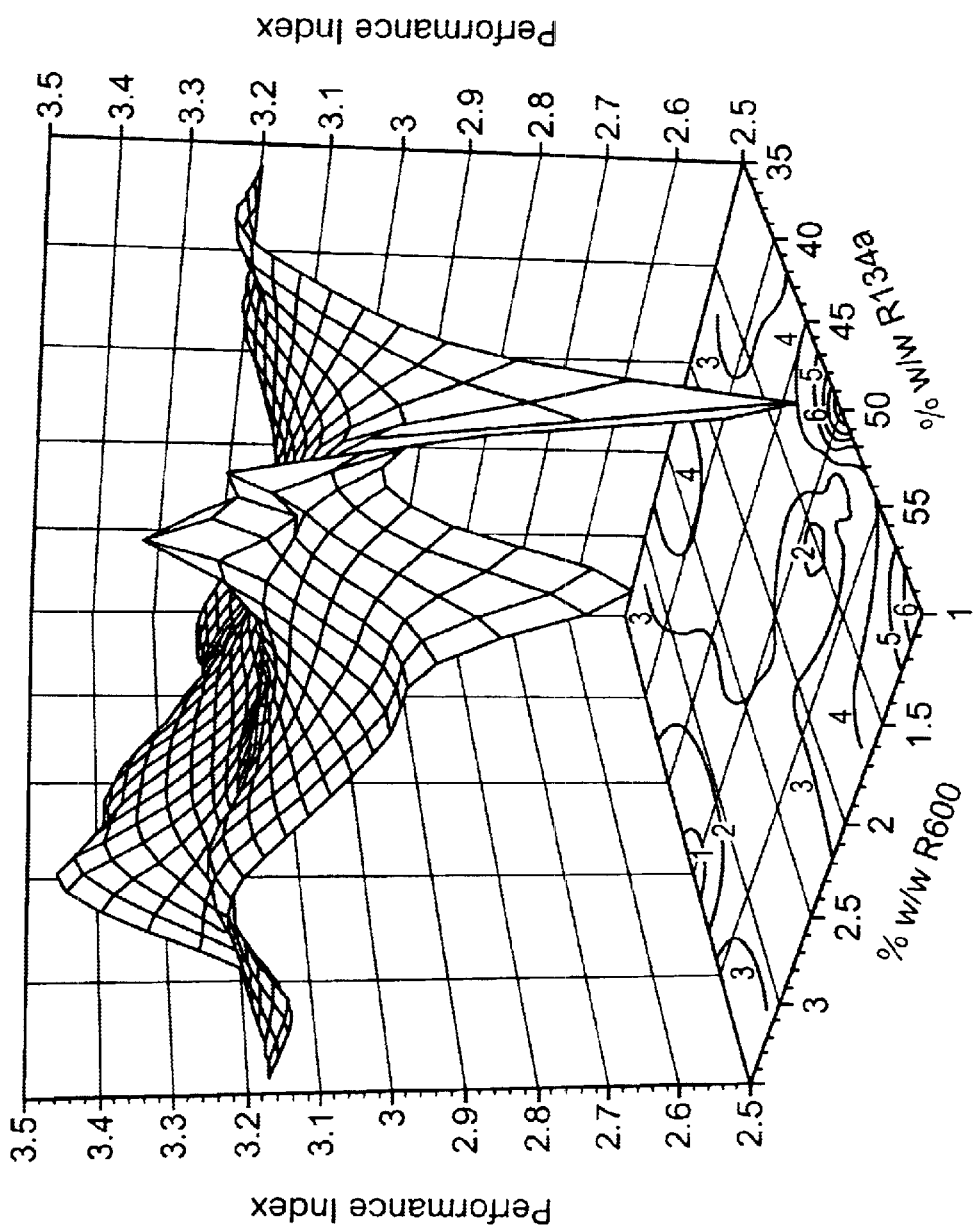

The present invention relates to refrigerant compositions, particularly for use as replacements in refrigeration equipment currently employing, or designed to employ, the refrigerants R12 and R22.

Refrigerant R12 ($CCl_2F_2$) has been a commonly used refrigerant especially in domestic refrigerators. However, R12 contains chlorine atoms and has been implicated in environmental damage to the ozone layer. As a result efforts have been made to replace R12 with a refrigerant formulation which does not involve the use of refrigerants such as R12 which contain chlorine atoms. Similar comments apply to R22 which is used principally for air conditioning systems.

Among alternatives, particular attention has been directed at R134a ($C_2H_2F_4$; 1,1,1,2-tetrafluoroethane) along with pentafluoroethane (R125) (b.pt. −48.6° C.). Commercial formulations of these two refrigerants involve the use of a hydrocarbon, namely propane, propylene or isobutane. While these refrigerant formulations are generally effective as replacements for R12 and R22, nevertheless it has been found that their use is not entirely satisfactory.

Difficulty has arisen with the flammability of the fractionated composition, that is to say the vapour above the liquid composition possesses flammability problems. As a result these commercial formulations can produce flammable compositions under some leak scenario conditions. The flammability of these refrigerant compositions resides in their hydrocarbon content. One of the purposes of incorporating the hydrocarbon is so that the formulation is compatible with the lubricants ordinarily used in R12 and R22 refrigeration equipment. The specific hydrocarbons have been selected because they possess the correct boiling point in relation to that of the fluorocarbon.

In our GB 2327427 we describe and claim a refrigerant composition which comprises (a) R125, R218 (octafluoropropane; b.pt. −36.7° C.), trifluoromethoxydifluoromethane (b.pt. −34.6° C.) or hexafluoro-cyclopropane (b.pt. −31.5° C.), or a mixture of two or more thereof, in an amount from 5 to 60% by weight based on the weight of the composition (b) R125, R134a, R134 (1,1,2,2-tetrafluoroethane), 1,1-difluoroethane (R152a; b.pt. −24.7° C.), trifluoromethoxypentafluoroethane (b.pt. −23.3° C.), 1,1,1,2,3,3,3-heptafluoropropane (R227ea; b.pt. −18.3° C.) or 1,1,1,2,2,3,3-heptafluoropropane (R227ca; b.pt. −16.3° C.), or a mixture of two or more thereof, in an amount from 30 to 94% by weight based on the weight of the composition and (c) an unsubstituted hydrocarbon of the formula $C_nH_m$ in which n is at least 4 and m is at least 2n−2, other than methyl propane, in an amount from 1 to 10% by weight based on the weight of the composition.

Surprisingly if a hydrocarbon with at least 4 carbon atoms other than methyl propane (isobutane) is used instead of those previously advocated the flammability of the fractionated composition is greatly reduced.

Two specific formulations are mentioned in this application. Both these formulations have 50% by weight of R134a and either 46.5% by weight of R125 and 4% by weight of n-butane or 46% by weight of R125 and 3.5% by weight of n-butane. Experiments have been conducted with variations in this formulation in order to assess their performance both as regards their cooling capacity and their coefficient of performance. As would be expected, as the concentration of n-butane is reduced the cooling capacity generally reduces.

However, surprisingly, according to the present invention it has been found that below a particular level, about 2.3% by weight of n-butane, the performance increases again such that the performance at a concentration of only 1.5% by weight is comparable to that of the formulation containing 3.5% by weight. It has also surprisingly been found that similar quantities of isobutane (methyl propane) is also very effective. Amounts greater than about 2.3% isobutane tend to give rise to flammability problems which do not arise at lower concentrations. Accordingly, the present invention provides a liquid refrigerant composition which comprises (generally in the liquid phase):

(a) pentafluoroethane, octafluoropropane, trifluoromethoxydifluoromethane or hexafluorocyclopropane, or a mixture of two or more thereof, in an amount of at least 35% based on the weight of the composition, (b) 1,1,1,2- or 1,1,2,2-tetrafluoroethane, trifluoromethoxypentafluoroethane, 1,1,1,2,3,3-heptafluoropropane or a mixture of two or more thereof, in an amount of at least 30% by weight based on the weight of the composition and (c) n-butane or isobutane, in an amount from 1% to less than 2.3% by weight based on the weight of the composition.

The present invention also provides a process for producing refrigeration which comprises condensing a composition of the present invention and thereafter evaporating the composition in the vicinity of a body to be cooled. The invention also provides a refrigeration apparatus containing, as refrigerant, a composition of the present invention.

Component (a) is present in an amount of at least 35% by weight based on the weight of the composition. In practice, the concentration will generally be at least 40% by weight although a general range is 35 to 65% by weight. A preferred range is 40 to 55% by weight, especially 45 to 52% by weight. Preferably, component (a) is R125 or a mixture containing at least an half (by mass) of R125. In the latter case it is advisable that the content of R125 in the total composition is at least 35%, preferably 40%, by weight. Most preferably component (a) is R125.

Component (b) is present in the composition in an amount of at least 30% by weight based on the weight of the composition. Typically, the component is present in an amount from 35% to 60% by weight, preferably 45 to 60% and especially 47.5 to 55% by weight. Component (b) is preferably R134a.

When component (a) is R125 and component (b) is R134a, the content of each is desirably 35 to 60% by weight, generally 40 to 60% by weight when component (c) is n-butane. Preferably the concentration of each is above 45 to 55% by weight.

The presence of at least one further component in the composition is not excluded. Thus although, typically, the composition will comprise the three essential components, a fourth component, at least, can also be present. Typical further components include hydrocarbons such as propane as well as other fluorocarbons and, in particular, hydrofluorocarbons, such as those having a boiling point at atmospheric pressure of at most −40° C., preferably at most −49° C., especially those where the F/H ratio in the molecule is at least 1, preferably R23, trifluoromethane and, most preferably, R32, difluoromethane. In general, the maximum concentration of these other ingredients does not exceed 30% by weight, typically not exceeding 20%, preferably not exceeding 10% and especially not exceeding 5% and more especially not exceeding 2%, by weight, based on the sum of the weights of components (a), (b) and (c). The presence of hydrofluorocarbons generally has a neutral effect on the desired properties of the formulation. Desirably the butane, especially n-butane, represents at least 70%, preferably at least 80% and more preferably at 90%, by weight of the total weight of hydrocarbons in the composition. It will be appreciated that it is preferable to avoid perhalocarbons so as to minimise any greenhouse effect.

It has been found that the compositions of the present invention are highly compatible with the mineral oil lubricants which have been conventionally used with CFC refrigerants. Accordingly the compositions of the present invention can be used with mineral oil and alkyl benzene lubricants including naphthenic oils, paraffin oils and silicone oils, and there is no need to employ fully synthetic lubricants such as polyol esters (POE), polyalkyleneglycols (PAG) and polyoxypropylene glycols which are needed for many of the newer refrigerant compositions. Further details of suitable lubricants which can be employed are disclosed in EP-A-399817.

The usual additives can be used including "extreme pressure" and antiwear additives, oxidation and thermal stability improvers, corrosion inhibitors, viscosity index improvers, pour point depressants, detergents, anti-foaming agents and viscosity adjusters. Examples of suitable additives are included in Table D in U.S. Pat. No. 4,755,316.

The following Examples further illustrate the present invention.

EXPERIMENTAL METHOD

The apparatus used incorporated a hermetic reciprocating compressor, forced air cooled condenser, manual expansion valve and an evaporator enclosed in an insulated bath filled with an aqueous glycol mixture. Electrical heater elements were fitted to the bath assembly in order to provide a heat load on the evaporator. Numerous thermocouples were fitted around the system to enable determination of the superheat and subcooling of the refrigerant. Pressure gauges were also fitted to allow the evaporator and condenser temperatures to be determined.

The refrigerant composition was charged to the calorimeter from the liquid phase cylinder access in order to avoid any shift in the composition. The capacity (heat extraction rate or duty) of the refrigerant compositions were determined by measuring the heat input to the bath balanced against the heat extraction by the refrigerant. The power consumption of the compressor was measured enabling the coefficient of performance (C.O.P.) to be determined. The evaporating temperature was 0° C., the condensing temperature 40° C. and the superheat 8K.

The results of formulations for R600 are shown in Table 1 with the Performance Index in descending order. These results are shown graphically in FIG. 1 of the accompanying drawings; the numbered contours represent the following values:

| Contour Key | |
|---|---|
| 1 = 3.4 | 5 = 3.0 |
| 2 = 3.3 | 6 = 2.9 |
| 3 = 3.2 | 7 = 2.8 |
| 4 = 3.1 | 8 = 2.7 |

TABLE 1

| Formulation / % w/w | | | Performance | | |
|---|---|---|---|---|---|
| % R125 | % R134a | % R600 | Duty/kW | C.O.P. | Index |
| 46.5 | 50.0 | 3.5 | 1.89 | 1.83 | 3.46 |
| 47.0 | 51.5 | 1.5 | 1.86 | 1.83 | 3.39 |
| 50.0 | 46.5 | 3.5 | 1.85 | 1.83 | 3.39 |
| 47.0 | 51.8 | 1.3 | 1.87 | 1.78 | 3.33 |
| 40.0 | 57.5 | 2.5 | 1.80 | 1.82 | 3.28 |
| 58.9 | 40.1 | 1.0 | 1.91 | 1.70 | 3.25 |
| 60.0 | 36.5 | 3.5 | 1.88 | 1.72 | 3.23 |
| 59.8 | 38.7 | 1.5 | 1.83 | 1.76 | 3.22 |
| 46.0 | 52.7 | 1.3 | 1.81 | 1.76 | 3.19 |
| 50.0 | 47.5 | 2.5 | 1.82 | 1.75 | 3.19 |
| 48.0 | 50.8 | 1.2 | 1.79 | 1.76 | 3.15 |
| 40.0 | 56.5 | 3.5 | 1.77 | 1.77 | 3.13 |
| 39.9 | 58.6 | 1.5 | 1.75 | 1.76 | 3.08 |
| 60.0 | 37.5 | 2.5 | 1.82 | 1.66 | 3.02 |
| 39.8 | 59.3 | 1.0 | 1.69 | 1.68 | 2.84 |
| 48.9 | 50.1 | 1.0 | 1.57 | 1.61 | 2.53 |

Performance Index–Duty×C.O.P., i.e. measure of overall performance.

Figure 2:
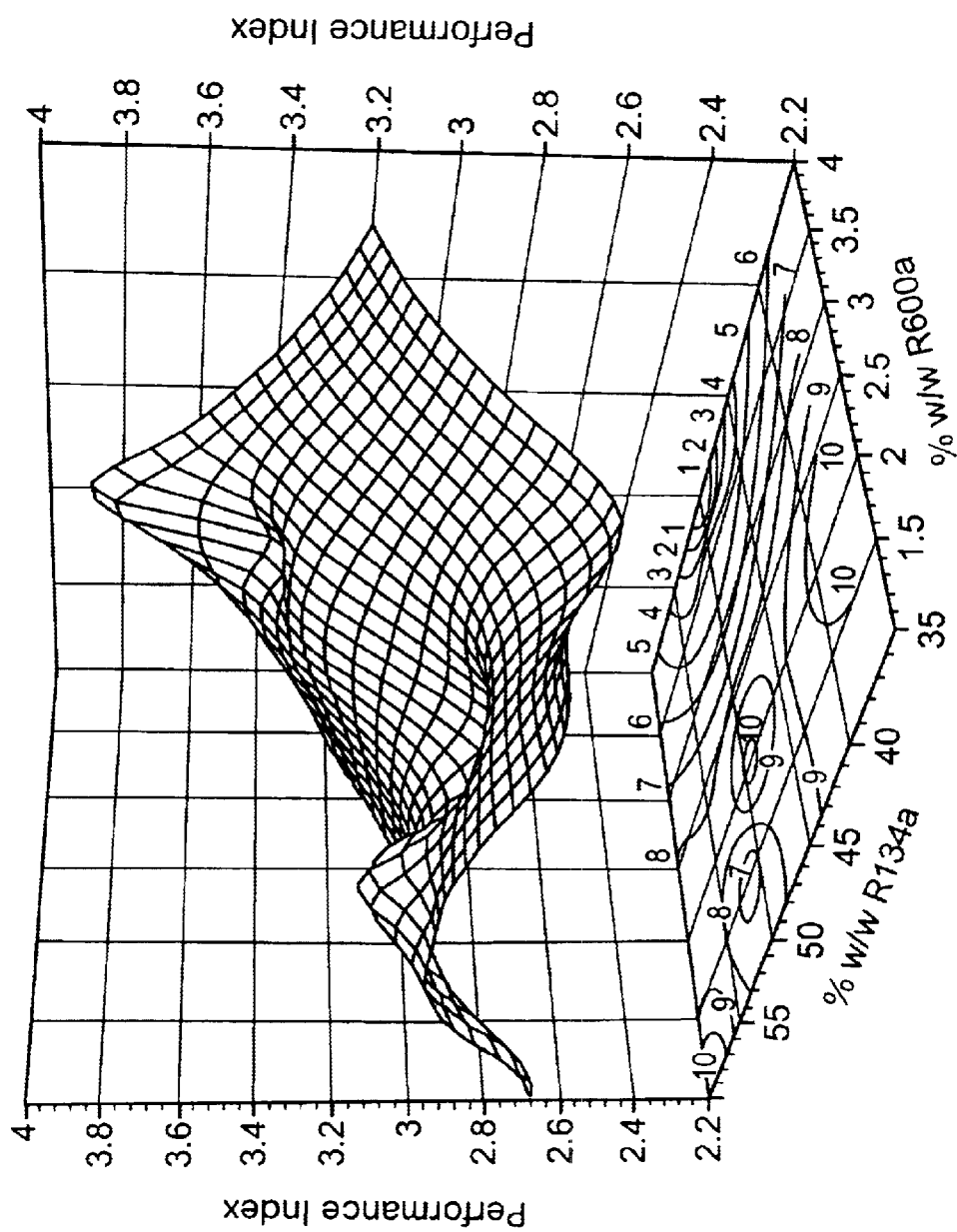

Results of formulations with R600a are shown similarly in Table 2 and in FIG. 2; the numbered contours represent the following values:

| Contour Key | |
|---|---|
| 1 = 3.7 | 6 = 3.2 |
| 2 = 3.6 | 7 = 3.1 |
| 3 = 3.5 | 8 = 3.0 |
| 4 = 3.4 | 9 = 2.9 |
| 5 = 3.3 | 10 = 2.8 |

TABLE 2

| Formulation / % w/w | | | Performance | | |
|---|---|---|---|---|---|
| % R125 | % R134a | % R600a | Duty/kW | C.O.P. | Index |
| 46.0 | 50.0 | 4.0 | 1.91 | 2.04 | 3.90 |
| 46.5 | 50.0 | 3.5 | 1.78 | 1.88 | 3.35 |
| 47.1 | 51.4 | 1.5 | 1.82 | 1.75 | 3.18 |
| 49.6 | 49.4 | 1.0 | 1.72 | 1.75 | 3.01 |
| 38.1 | 59.9 | 2.0 | 1.70 | 1.74 | 2.96 |
| 59.4 | 39.6 | 1.0 | 1.75 | 1.62 | 2.82 |
| 48.6 | 49.4 | 2.0 | 1.71 | 1.61 | 2.75 |
| 39.4 | 59.6 | 1.0 | 1.63 | 1.64 | 2.68 |
| 60.2 | 37.8 | 2.0 | 1.70 | 1.57 | 2.67 |

What is claimed is:

1. A refrigerant composition which comprises:
   (a) pentafluoroethane, octafluoropropane, trifluoromethoxydifluoromethane or hexafluorocyclopropane, or a mixture of two or more thereof, in an amount of at least 35% based on the weight of the composition,
   (b) 1,1,1,2- or 1,1,2,2-tetrafluoroethane, or trifluoromethoxypentafluoroethane, or a mixture of two or more thereof, in amount of at least 30% by weight based on the weight of the composition and
   (c) n-butane or isobutane, in amount from 1% to less than 2.3% by weight based on the weight of the composition, wherein that the total concentration of further component(s) does not exceed 30% by weight based on the weight of the composition.

2. A composition according to claim 1 in which component (c) is present in an amount above 1.0 up to 2.0% by weight based on the weight of the composition.

3. A composition according to claim 2 in which component (c) is present in an amount of about 1.5% by weight based on the weight of the composition.

4. A composition according to claim 1 in which component (a) is pentafluorethane.

5. A composition according to claim 4 in which component (a) is present in an amount from 35 to 65% by weight based on the weight of the composition.

6. A composition according to claim 5 in which component (a) is present in an amount from 40 to 55% by weight based on the weight of the composition.

7. A composition according to claim 6 in which component (a) is present in an amount from 45 to 52% by weight based on the weight of the composition.

8. A composition according to claim 1 in which component (b) is 1,1,1,2-tetrafluoroethane.

9. A composition according to claim 8 in which component (b) is present in an amount from 35 to 60% by weight based on the weight of the composition.

10. A composition according to claim 9 in which component (b) is present in an amount from 45 to 60% by weight based on the weight of the composition.

11. A composition according to claim 10 in which component (b) is present in an amount from 47.5 to 55% by weight based on the weight of the composition.

12. A composition according to claim 1 which components (a) and (b) each are present in an amount from 35 to 60% by weight based on the weight of the composition.

13. A composition according to claim 12 in which components (a) and (b) each are present in an amount from above 45 to 55% by weight based on the weight of the composition.

14. A composition according to claim 1 in which component (c) is n-butane.

15. A composition according to claim 1 which comprises a further component.

16. A composition according to claim 15 in which the further component is a hydrofluorocarbon.

17. A composition according to claim 16 in which the hydrofluorocarbon has a boiling point at atmospheric pressure of at most −40° C.

18. A composition according to claim 16 in which the F/H ratio in the hydrofluoromethane is at least 1.

19. A composition according to claim 18 in which the hydrofluorocarbon is difluoromethane or trifluoromethane.

20. A composition according to claim 15 in which the further component is present in an amount not exceeding 5% by weight based on the weight of (a), (b) and (c).

21. A composition according to claim 20 in which the further component is present in an amount not exceeding 2% by weight based on the weight of (a), (b) and (c).

22. A refrigerant in a refrigeration apparatus comprising the composition according to claim 1.

23. The process for producing refrigeration which comprises condensing a composition as claimed in claim 1 and thereafter evaporating the composition in the vicinity of a body to be cooled.

24. A refrigeration apparatus containing, as refrigerant, a composition as claimed in claim 1.

* * * * *